(No Model.)

J. W. RIGG.
DEVICE FOR CLOSING GATES.

No. 366,878. Patented July 19, 1887.

WITNESSES:
J. D. Garfield
C. Sedgwick

INVENTOR:
J. W. Rigg
BY Munn & Co.
ATTORNEYS.

UNITED STATES PATENT OFFICE.

JAMES W. RIGG, OF MOUNT CARMEL, ILLINOIS.

DEVICE FOR CLOSING GATES.

SPECIFICATION forming part of Letters Patent No. 366,878, dated July 19, 1887.

Application filed April 16, 1887. Serial No. 235,064. (No model.)

*To all whom it may concern:*

Be it known that I, JAMES W. RIGG, of Mount Carmel, in the county of Wabash and State of Illinois, have invented a new and Improved Device for Closing Gates, of which the following is a full, clear, and exact description.

My invention relates to a device for automatically closing gates, and has for its object to provide a device simple in construction and readily applicable to any gate at a minimum cost.

The invention consists in the construction and combination of the several parts, as will be hereinafter fully set forth, and pointed out in the claim.

Reference is to be had to the accompanying drawings, forming a part of this specification, in which similar letters of reference indicate corresponding parts in both the figures.

Figure 1:
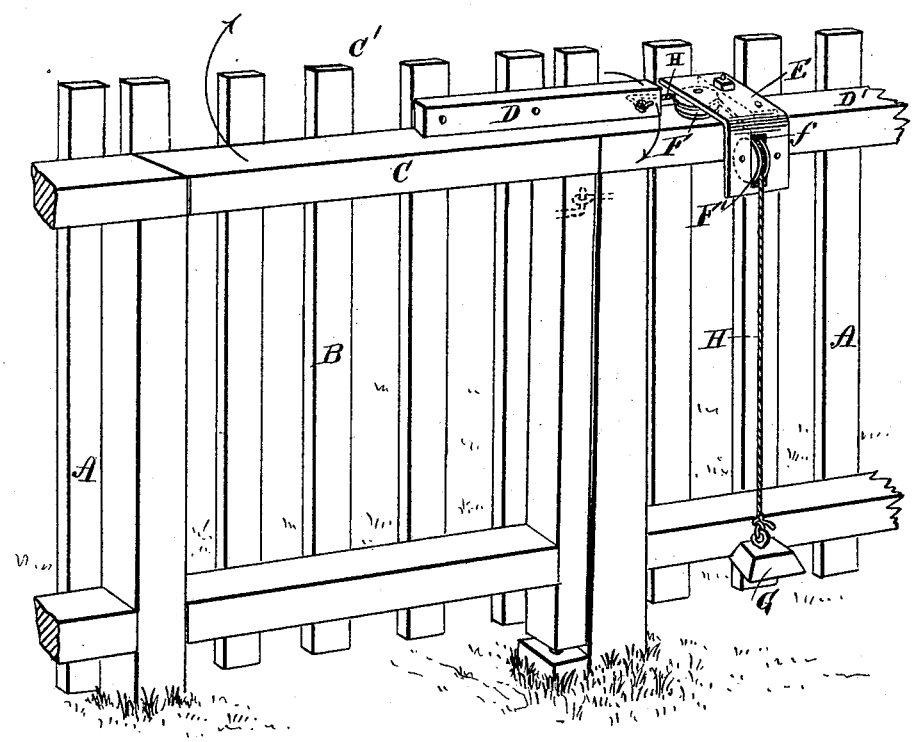
Figure 2:
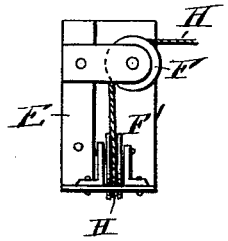

Figure 1 is a perspective view of my device as applied to a gate, and Fig. 2 is a bottom plan view of the frame and pulleys.

In carrying out the object of the invention, A represents a section of fencing, and B a gate hinged thereto, adapted to swing outward, as indicated by the arrows.

Upon the top of the gate-frame C, or to the vertical rails or paling C' thereof, a bar, D, is fastened, adapted to project unattached beyond the hinged end of the gate horizontally over the top horizontal beam, D', of the fence. At the rear of the said bar D, preferably near thereto, an angular frame, E, is secured upon the said top beam, D', of the fence, in or to which two pulleys, F F', are journaled, one pulley being journaled to stand in a horizontal position and the other at right angles thereto, or in vertical position, and projecting a slight distance through a vertical slot, $f$, cut in the frame E, as shown in Fig. 1.

A cord, rope, or chain, H, is attached to the end of the bar D, which acts as a lever, the other end of said cord being passed around the horizontal pulley F and over the vertical pulley F' through the slot $f$ in the frame downward near the ground, where a counter-balance is attached in the shape of a weight, G.

In operation when the gate is opened the lever-bar D will be carried inward in direction of the arrow, and the weight G will be drawn up. Upon releasing the gate the weight acting upon the lever D will cause the same to automatically close said gate.

The application of the device and the device itself are very simple, and, as will be readily seen, may be manufactured at little cost and applied to any form of gate.

I do not limit myself to any particular kind of frame, or to any particular manner of journaling the pulleys within the frame, as the said frame may be made of wood and a box-pulley may be employed, and the cord or chain may be passed through the lever from either side, as found desirable.

Having thus described my invention, what I claim as new, and desire to secure by Letters Patent, is—

The combination, with the fence A and gate B, hinged thereto, of a horizontal lever, D, attached to the gate to project beyond the hinged side thereof, an angular frame, E, secured to the fence to the rear of said lever and provided with a vertical slot, $f$, a pulley, F, journaled horizontally in said frame, and a second pulley, F', journaled vertically therein and projecting through said slot $f$, a rope, H, attached to said lever, passing around the pulley F, over the pulley F', and through the slot $f$, and a weight, G, attached to the lower end of said rope, substantially as shown and described.

JAMES W. RIGG.

Witnesses:
E. F. BEALL,
S. R. PUTNAM.